US012566235B2

(12) United States Patent
Chen et al.

(10) Patent No.: US 12,566,235 B2
(45) Date of Patent: Mar. 3, 2026

(54) METHOD, DEVICE, COMPUTER STORAGE MEDIUM AND TERMINAL FOR REALIZING LOCATION SWITCHING PROCESSING

(71) Applicant: TruePoint Technology Inc., Beijing (CN)

(72) Inventors: Kongzhe Chen, Beijing (CN); Guangyu Zhou, Beijing (CN); Jingbo Gao, Beijing (CN)

(73) Assignee: TRUEPOINT TECHNOLOGY INC., Beijing (CN)

( * ) Notice: Subject to any disclaimer, the term of this patent is extended or adjusted under 35 U.S.C. 154(b) by 768 days.

(21) Appl. No.: 18/045,147

(22) Filed: Oct. 8, 2022

(65) Prior Publication Data

US 2023/0168335 A1     Jun. 1, 2023

(30) Foreign Application Priority Data

Nov. 26, 2021    (CN) .......................... 202111422251.5

(51) Int. Cl.
*G01S 5/02*          (2010.01)
*G01S 5/00*          (2006.01)

(52) U.S. Cl.
CPC .......... *G01S 5/0284* (2013.01); *G01S 5/0018* (2013.01)

(58) Field of Classification Search
CPC ........ G01S 19/073; G01S 19/40; G01S 19/42; G01S 19/43
See application file for complete search history.

(56) References Cited

U.S. PATENT DOCUMENTS

| | | | |
|---|---|---|---|
| 2012/0127032 A1* | 5/2012 | McClure | G01S 19/13 |
| | | | 342/357.44 |
| 2017/0269216 A1* | 9/2017 | Dai | G01S 19/05 |
| 2020/0278451 A1* | 9/2020 | Wei | G01S 19/05 |

* cited by examiner

*Primary Examiner* — Barry W Taylor
(74) *Attorney, Agent, or Firm* — HAUPTMAN HAM, LLP

(57) ABSTRACT

A method includes calculating, by a mobile station, a second coordinate according to a first coordinate and a first observation value of a first base station, and a second observation value published by a second base station; and determining, according to the calculated second coordinate, whether there is a deviation in a third coordinate published by the second base station. When there is a deviation in the third coordinate, calculating location information of the mobile station according to the second coordinate and the observation value of the second base station, wherein the first coordinate and the first observation value are information used for calculating the location information of the mobile station before base station is switched. The first base station publishes the coordinate to the mobile station before base station is switched; and the second base station publishes the coordinate to the mobile station after base station is switched.

8 Claims, 3 Drawing Sheets

Second base station
(second coordinate)

First base station
(coordinate $B_1$)

Second base station (third coordinate)

Mobile station
(coordinate $R_2$)

Mobile station
(coordinate $R_1/R_2'$)

First base station (coordinate $B_1$)

Second base station (coordinate $B_2$)

Mobile station (coordinate $R_1/R_2$)

First base station (coordinate $B_1$)

Second base station (coordinate $B_2$)

Second base station (coordinate $B_2'$)

Mobile station (coordinate $R_2$)

Mobile station (coordinate $R_1/R_2'$)

First resolution unit

↓

Determination unit

↓

Second resolution unit

METHOD, DEVICE, COMPUTER STORAGE MEDIUM AND TERMINAL FOR REALIZING LOCATION SWITCHING PROCESSING

RELATED APPLICATIONS

The present application claims priority from Chinese Application Number 202111422251.5, filed Nov. 26, 2021, the disclosure of which is hereby incorporated by reference herein in its entirety.

TECHNICAL FIELD

The present invention relates to, but is not limited to, satellite positioning technology, especially a method, device, computer storage medium and terminal for realizing location switching processing.

BACKGROUND

At present, most surveying and mapping, precision agriculture, intelligent robots, intelligent driving, and unmanned aerial vehicles require positioning services with centimeter-level precision. These devices mainly provide location services through satellite positioning. The technologies that can provide centimeter-level satellite positioning services mainly comprise Real-Time Kinematic (RTK) and Precise Point Positioning (PPP). RTK and PPP both require the support of external precision data.

RTK technology is currently the most widely used high-precision satellite positioning technology, and more than 90% of centimeter-level satellite positioning uses RTK services. RTK requires the support of a base station. Using the error correlation between stations, a mobile station eliminates or weakens errors such as satellite orbits, satellite clock errors, ionosphere, and troposphere through an observation value of the base station, thereby achieving centimeter-level positioning precision, where the satellite clock error is unrelated to the distance between the stations and can be completely eliminated, while the satellite orbit, ionosphere and troposphere errors are related to the distance between the stations; the closer the distance between the base station and the mobile station, the stronger the error correlation; the smaller the residual after the single difference between the observation values of the mobile station and the base station, the weaker the correlation when the distance is farther; and after the distance between the base station and the mobile station exceeds a certain distance (such as 30 kilometers, the effective working range of a single base station is generally within a radius of 30 kilometers), the atmospheric residual will reach the decimeter level, it is difficult to fix double-difference ambiguity, and it will not be possible to realize centimeter-level positioning.

In order to satisfy the requirements of large-range positioning precision, it is generally required to establish base station networks including multiple base stations, and the mobile station receives the latest base station data to realize RTK positioning. Some base station networks use a single-station mode to provide customers with the latest physical base station data, and some use a network RTK mode to provide customers with the latest virtual base station data. Regardless of the mode, for applications such as unmanned aerial vehicles, intelligent driving, and precision agriculture, base station switching will inevitably occur in a travel process. A base station data service provider will try its best to ensure that coordinates are set for all the base stations in its base station networks based on a same frame and the coordinates have consistent precision, so that the location of the mobile station will not jump during base station switching. FIG. 1 is a schematic diagram of a mobile station performing base station switching in the related art. As shown in FIG. 1, when a mobile station R switches from a first base station B1 to a second base station B2, if the coordinates published by B1 and B2 to R are based on a same frame and have same precision, a coordinate R1 of R calculated through the observation value and coordinate of B1, and a coordinate R2 of R calculated through the observation value and coordinate published by B2 are necessarily the same. If a base station antenna is moved (human factors or geological factors) and this case is not found, or the frame of different service provider setting the coordinates of the base stations or accuracy is inconsistent, the coordinates R1 and R2 are inconsistent, that is, the calculated coordinates R1 and R2 are inconsistent. In this case, when the location of the mobile station will jump during base station switching. FIG. 2 is a schematic diagram of the location jump of a mobile station in the related art. As shown in FIG. 2, when a mobile station R switches from $B_1$ to $B_2$, if an offset occurs in $B_2$ or the frame for setting the coordinates of the base stations or precision is inconsistent, its actual coordinate is $B_2'$ ($X_2'$, $Y_2'$, $Z_2'$), while the coordinate published by B2 is an uncorrected coordinate $B_2$ ($X_2$, $Y_2$, $Z_2$). The mobile station obtains that there is a deviation between a coordinate $R_2$ and a coordinates $R_1$ through the coordinate and observation value published by $B_2$. In this case, the location of the mobile station will jump during base station switching. Location jump will cause unmanned aerial vehicles, agricultural machinery, automobiles, etc. to deviate from the heading and to be unable to travel according to a designed route. How to overcome jump during base station switching has become a technical problem to be solved.

SUMMARY

The following is a summary of the subject matter described in detail in the present invention. This summary is not intended to limit the scope of protection of the claims.

Embodiments of the present invention provide a method, device, computer storage medium and terminal for realizing location switching processing, which can realize smooth positioning of a mobile station in a base station switching process.

The embodiments of the present invention provide a method for realizing location switching processing, comprising:

calculating, by a mobile station, a second coordinate according to a first coordinate and a first observation value of a first base station and a second observation value published by a second base station;

determining, according to the calculated second coordinate, whether there is a deviation in a third coordinate published by the second base station; and when it is determined that there is a deviation in the third coordinate published by the second base station, calculating location information of the mobile station according to the second coordinate and the observation value of the second base station, wherein the first coordinate and the first observation value are information used for calculating the location information of the mobile station before base station is switched; the first base station is a base station that publishes a coordinate to the mobile station before base station is switched; and the second base station is a base station that publishes a coordinate to the mobile station after base station is switched.

In another aspect, the embodiments of the present invention further provide a computer storage medium, wherein a computer program is stored in the computer storage medium, and when the computer program is executed by a processor, the foregoing method for realizing location switching processing is realized.

In still another aspect, the embodiments of the present invention further provide a terminal, comprising: a memory and a processor, wherein a computer program is stored in the memory, wherein the processor is configured to execute the computer program in the memory; and when the computer program is executed by the processor, the method for realizing location switching processing as described above is realized.

In yet another aspect, the embodiments of the present invention further provide a device for realizing location switching processing, comprising: a first resolution unit, a determination unit, and a second resolution unit, wherein the first resolution unit is configured to: calculate a second coordinate according to a first coordinate and a first observation value of a first base station and a second observation value published by a second base station;

the determination unit is configured to: determine, according to the calculated second coordinate, whether there is a deviation in a third coordinate published by the second base station; and the second resolution unit is configured to: when it is determined that there is a deviation in the third coordinate published by the second base station, calculate location information of a mobile station according to the second coordinate and the observation value of the second base station, wherein the first coordinate and the first observation value are information used for calculating the location information of the mobile station before base station is switched; the first base station is a base station that publishes a coordinate to the mobile station before base station is switched; and the second base station is a base station that publishes a coordinate to the mobile station after base station is switched.

The technical solution of the present application comprises: calculating, by a mobile station, a second coordinate according to a first coordinate and a first observation value of a first base station and a second observation value published by a second base station; determining, according to the calculated second coordinate, whether there is a deviation in a third coordinate published by the second base station; and when there is a deviation in the third coordinate, calculating location information of the mobile station according to the second coordinate and the observation value of the second base station, wherein the first coordinate is a coordinate used for calculating the location information of the mobile station before base station is switched; the first base station is a base station that publishes a coordinate to the mobile station before base station is switched; and the second base station is a base station that publishes a coordinate to the mobile station after base station is switched. According to the embodiments of the present invention, when it is determined that there is a deviation in the third coordinates published by the second base station during base station switching, the location information of the mobile station is calculated according to the second coordinate, thereby realizing smooth positioning of the mobile station in a base station switching process.

Other features and advantages of the present invention will be set forth in the following description, and in part will be apparent from the description, or may be understood by implementing the present invention. The purpose and other advantages of the present invention may be realized and obtained through the structure particularly pointed out in the description, the claims, and the drawings.

BRIEF DESCRIPTION OF THE DRAWINGS

The drawings are provided to further understand the technical solution of the present invention, and constitute a part of the description. The drawings, along with embodiments of the present application, are used to explain the technical solution of the present invention, and do not constitute a limitation to the technical solution of the present invention.

DETAILED DESCRIPTION

Figure 1:
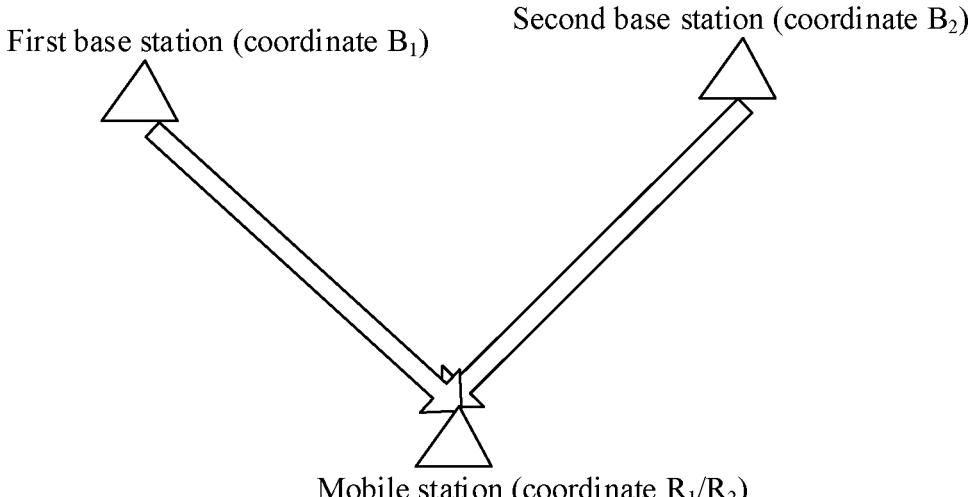
FIG. 1 is a schematic diagram of a mobile station performing base station switching in the related art.
Figure 2:
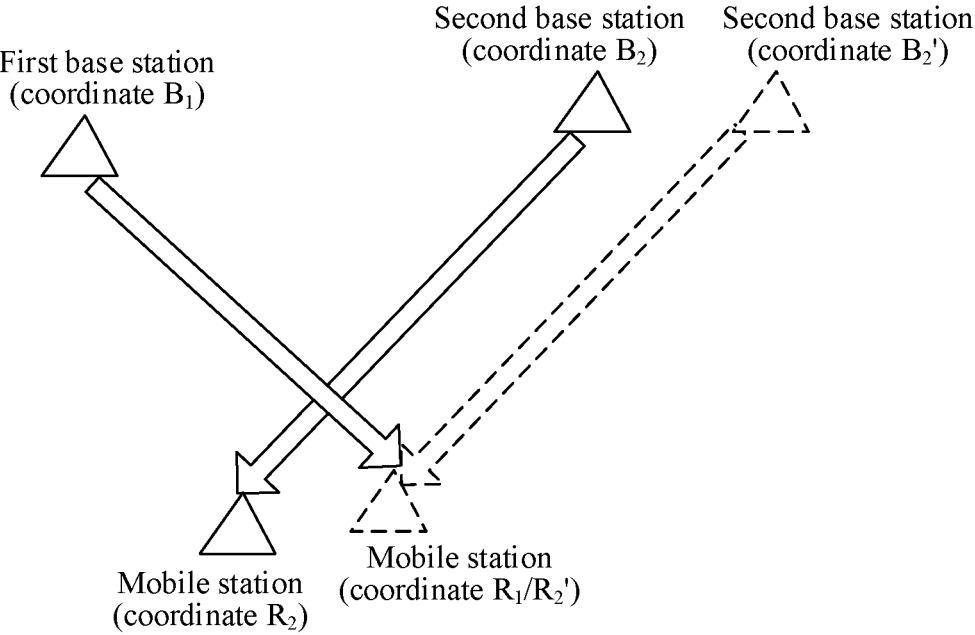
FIG. 2 is a schematic diagram of the location jump of a mobile station in the related art.

To make the purpose, the technical solution, and advantages of the present invention clearer, embodiments of the present invention will be described in detail below with reference to the drawings. It should be noted that the embodiments in the present application and the features in the embodiments may be arbitrarily combined with each other in the case of no conflict.

The steps shown in the flowchart of the drawing may be performed in, for example, a computer system of a set of computer-executable instructions. Moreover, although a logical order is shown in the flowchart, in some cases, steps shown or described may be performed in an order different from that herein.

Figure 3:
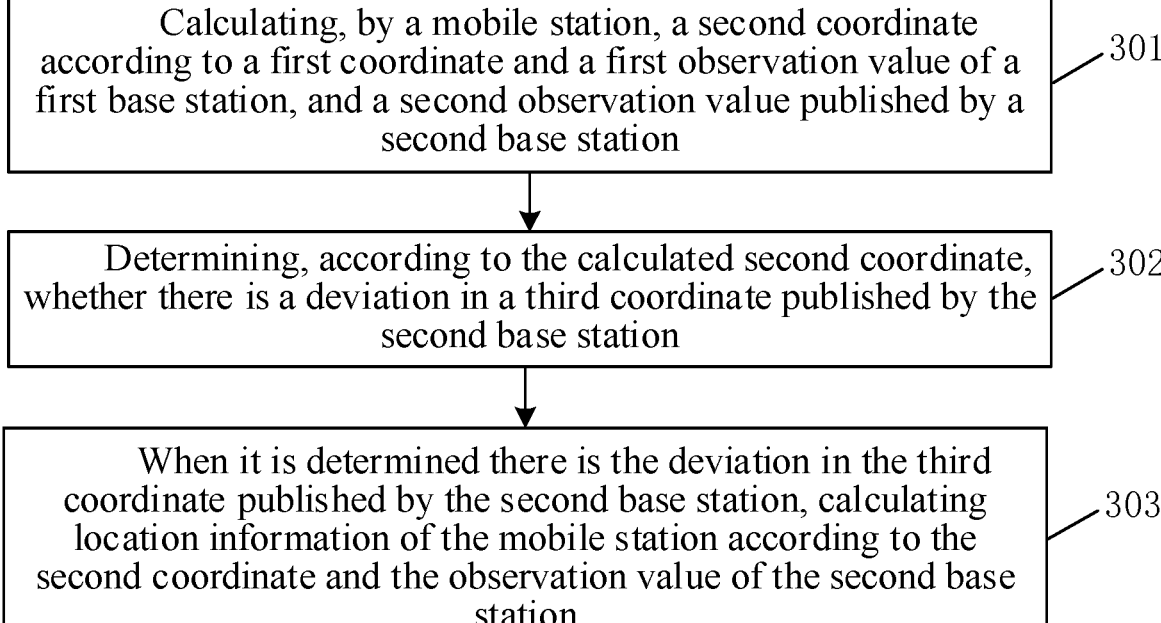
FIG. 3 is a flowchart of a method for realizing location switching processing according to the embodiment of the present invention.

FIG. 3 is a flowchart of a method for realizing location switching processing according to the embodiments of the present invention. As shown in FIG. 3, the method comprises the following steps.

At step 301, a mobile station calculates a second coordinate according to a first coordinate and a first observation value of a first base station and a second observation value published by a second base station, wherein the first coordinate and the first observation value are information used for calculating location information of the mobile station before base station is switched. In an exemplary example, the calculation in the embodiments of the present invention comprises Real-Time Kinematic (RTK) calculation in the related art.

In an exemplary example, the first observation value and the second observation value in the embodiments of the present invention comprise values for eliminating or weakening errors such as satellite orbits, satellite clock errors, ionosphere, and troposphere.

At step 302, according to the calculated second coordinate, it is determined whether there is a deviation in a third coordinate by the second base station.

At step 303, when it is determined that there is a deviation in the third coordinate published by the second base station, location information of the mobile station is calculated according to the second coordinate and the observation value of the second base station.

The first coordinate and the first observation value are information used for calculating the location information of the mobile station before base station is switched; the first base station is a base station that publishes a coordinate to the mobile station before base station is switched; and the second base station is a base station that publishes a coordinate to the mobile station after base station is switched.

In an exemplary example, after the location information of the mobile station is calculated according to the second coordinate and the observation value of the second base station, as long as the mobile station receives the third coordinate published by the second base station, the mobile station will always calculate the location information according to the second coordinate and the observation value of the second base station.

According to the embodiments of the present invention, when it is determined that there is a deviation in the third coordinate published by the second base station during base station switching, a coordinate of the mobile station is calculated according to the second coordinate, thereby realizing smooth positioning of the mobile station in a base station switching process.

In an exemplary example, in a mobile station switching processing process according to the embodiments of the present invention, the first coordinate and the first observation value are always coordinates used for calculating the location information of the mobile station.

In an exemplary example, the determining whether there is a deviation in a third coordinate published by the second base station according to the embodiments of the present invention comprises:

for the third coordinate and the second coordinate, determining a coordinate difference of each dimension;

when the coordinate difference of more than one dimension is greater than a preset difference threshold, determining that there is a deviation in the third coordinate published by the second base station; and when the coordinate difference of each dimension is less than or equal to the difference threshold, determining that there is no deviation in the third coordinate published by the second base station, wherein the dimension comprises a direction of a coordinate axis.

In an exemplary example, if the second coordinate and the third coordinate are three-dimensional coordinates, the coordinate difference of each dimension according to the embodiments of the present invention comprises: calculating the difference between coordinate values of the second coordinate and the third coordinate in an X-axis to obtain a coordinate difference in an X-axis direction; and similarly, calculating a coordinate difference in a Y-axis direction and a coordinate difference in a Z-axis direction.

In one exemplary example, the difference threshold in the embodiments of the present invention is equal to 5 centimeters.

In an exemplary example, according to the embodiments of the present invention, it can be determined according to the error of RTK calculation and the requirement of positioning precision that the error of the RTK calculation is $(1+10^{-6}*D)$ centimeter, wherein D is the length of a baseline, and the unit is meter; and the difference threshold in the embodiments of the present invention may be adjusted by a person skilled in the art according to experience.

In an exemplary example, the method according to the embodiments of the present invention further comprises:

when it is determined that there is no deviation in the third coordinate published by the second base station, calculating the location information of the mobile station according to the third coordinate and the observation value of the second base station.

Figure 4:
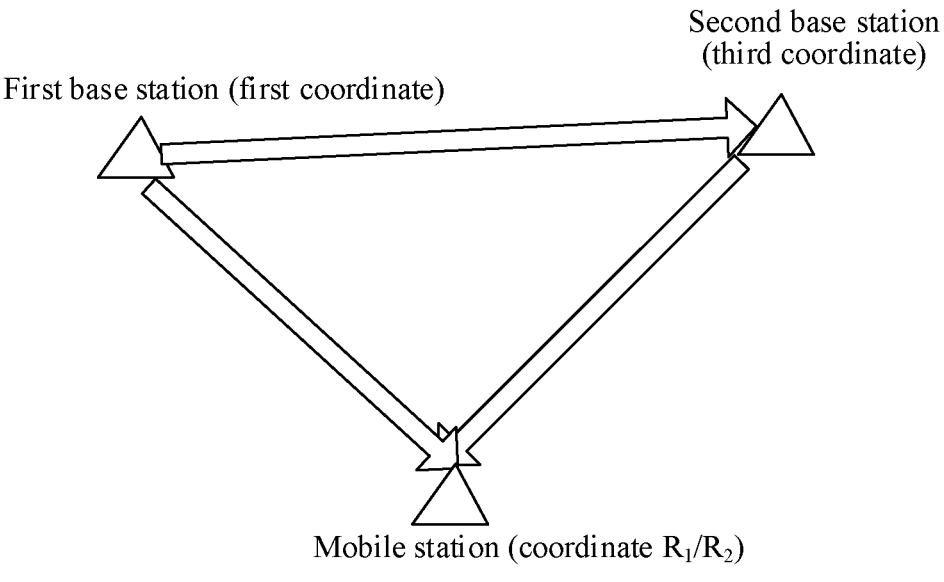
FIG. 4 is a schematic diagram of calculating a coordinate of a mobile station according to a third coordinate according to the embodiment of the present invention.

When it is determined that there is no deviation in the third coordinate published by the second base station according to the embodiments of the present invention, the location information of the mobile station is calculated using the third coordinate published by the second base station after base station is switched according to the embodiments of the present invention. FIG. 4 is a schematic diagram of calculating a coordinate of a mobile station according to a third coordinate. As shown in FIG. 4, the third coordinate published by a second base station basically coincides with the calculated second coordinate; therefore, a coordinate R1 of the mobile station calculated according to a first coordinate and an observation value of a first base station also basically coincides with a coordinate R2 of the mobile station calculated according to the third coordinate and an observation value of the second base station.

Figures 5, 6:
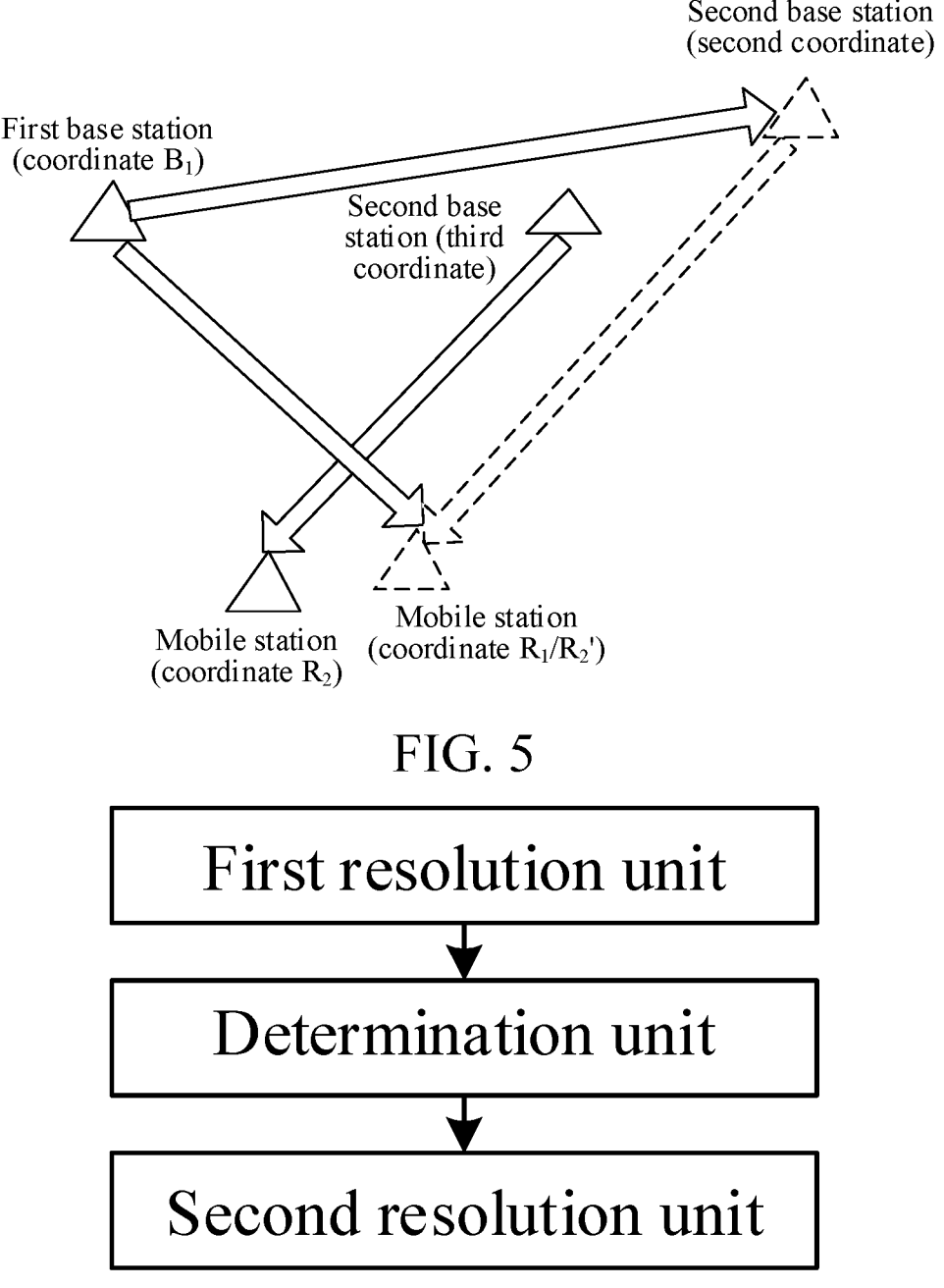
FIG. 5 is a schematic diagram of calculating a coordinate of a mobile station according to a second coordinate according to the embodiment of the present invention.
FIG. 6 is a structural block diagram of a device for realizing location switching processing according to the embodiment of the present invention.

When it is determined that there is a deviation in the third coordinate published by the second base station according to the embodiments of the present invention, the location information of the mobile station is calculated according to the calculated second coordinate. FIG. 5 is a schematic diagram of calculating a coordinate of a mobile station according to a second coordinate according to the embodiments of the present invention. As shown in FIG. 5, because there is a deviation in a third coordinate published by a second base station, a coordinate R1 of the mobile station calculated according to a first coordinate and an observation value of a first base station basically coincides with a coordinate R2' of the mobile station calculated according to the second coordinate and an observation value of the second base station; however, there is a deviation between R1 and R2' and a coordinate R2 of the mobile station calculated according to the third coordinate and the observation value published by the second base station.

The following briefly describes the embodiments of the present invention by taking the difference threshold equal to 5 centimeters as an example: in the embodiments of the present invention, it is assumed that the mobile station switches from the first base station $B_1$ to the second base station $B_2$, and the coordinate of $B_2$ is verified first. During base station switching, the mobile station R has both the first coordinate $(X_1, Y_1, Z_1)$ and the observation value published by $B_1$ and the third coordinate $(X_3, Y_3, Z_3)$ and the observation value published by $B_2$. The mobile station R obtains the second coordinate $(X_2, Y_2, Z_2)$ through RTK calculation using the first coordinate and the first observation value used for calculating the location information of the mobile station before base station is switched and the second observation value published by $B_2$; when the third coordinate published by $B_2$ is correct, $(X_2, Y_2, Z_2)=(X_3, Y_3, Z_3)$; and in the embodiments of the present invention, coordinate calculation can be performed directly using the coordinate $(X_3, Y_3,$ $Z_3$) published by $B_2$, and therefore, the mobile station R completes base station switching according to a normal RTK work flow. Because there is an error in an RTK calculation process, the error is (1+1.0e-6×D) centimeter, D in the expression is the length of the baseline, and the unit is meter. Therefore, there is also an error in the third coordinate of $B_2$ obtained through RTK calculation using the first coordinate and the observation value published by $B_1$ and the observation value published by $B_2$, and the third coordinate cannot be completely equal to the second coordinate; and referring to the design that the baseline distance between $B_1$ and $B_2$ generally does not exceed 30 kilometers, the error of the second coordinate generally does not exceed 5 centimeters. For most RTK work, a jump of 5 centimeters is acceptable; therefore, in the embodiments of the present invention, it is set that the coordinate difference of each dimension (the coordinate difference in three coordinate axis directions: $X_3$-$X_2$, $Y_3$-$Y_2$, and $Z_3$-$Z_2$) is less than 5 centimeters, it is determined that there is no deviation in the third coordinate ($X_3$, $Y_3$, $Z_3$) published by $B_2$, and the coordinate of the mobile station can be calculated directly through the third coordinate published by $B_2$.

The embodiments of the present invention further provide a computer storage medium, wherein a computer program is stored in the computer storage medium, and when the computer program is executed by a processor, the foregoing method for realizing location switching processing is realized.

The embodiments of the present invention further provide a terminal, comprising: a memory and a processor, wherein a computer program is stored in the memory, wherein the processor is configured to execute the computer program in the memory; and when the computer program is executed by the processor, the method for realizing location switching processing as described above is realized.

FIG. 6 is a structural block diagram of a device for realizing location switching processing according to the embodiments of the present invention. As shown in FIG. 6, the device comprises a first resolution unit, a determination unit, and a second resolution unit, wherein the first resolution unit is configured to: calculate a second coordinate according to a first coordinate and a first observation value of a first base station and a second observation value published by a second base station;

the determination unit is configured to: determine, according to the calculated second coordinate, whether there is a deviation in a third coordinate published by the second base station; and the second resolution unit is configured to: when it is determined that there is a deviation in the third coordinate published by the second base station, calculate location information of a mobile station according to the second coordinate and the observation value of the second base station, wherein the first coordinate and the first observation value are information used for calculating the location information of the mobile station before base station is switched; the first base station is a base station that publishes a coordinate to the mobile station before base station is switched; and the second base station is a base station that publishes a coordinate to the mobile station after base station is switched.

In an exemplary example, the determination unit in the embodiments of the present invention is configured to:

for the third coordinate and the second coordinate, determine a coordinate difference of each dimension;

when the coordinate difference of more than one dimension is greater than a preset difference threshold, determine that there is a deviation in the third coordinate published by the second base station; and when the coordinate difference of each dimension is less than or equal to the difference threshold, determine that there is no deviation in the third coordinate published by the second base station.

In one exemplary example, the difference threshold in the embodiments of the present invention is equal to 5 centimeters.

In one exemplary example, the second resolution unit in the embodiments of the present invention is further configured to:

when the determination unit determines that there is no deviation in the third coordinate published by the second base station, calculate the location information of the mobile station according to the third coordinate and the observation value of the second base station.

"A person of ordinary skill in the art may understand that all or some of the steps in the method disclosed above, the system, and functional modules/units in the device can be implemented as software, firmware, hardware, and an appropriate combination thereof. In a hardware implementation mode, the division of the functional modules/units mentioned in the above description does not necessarily correspond to the division of physical components; for example, one physical component may have multiple functions, or one function or step may be performed cooperatively by several physical components. Some or all of the components may be implemented as software executed by a processor, such as a digital signal processor or a microprocessor, or as hardware, or as an integrated circuit, such as an application-specific integrated circuit. Such software may be distributed on a computer-readable medium, which may comprise a computer storage medium (or a non-transitory medium) and a communication medium (or a transitory medium). As well-known to a person of ordinary skill in the art, the term computer storage medium comprises volatile and nonvolatile, removable and non-removable media implemented in any method or technology for storing information, such as a computer-readable instruction, a data structure, a program module, or other data. The computer-readable medium comprises, but is not limited to, a RAM, a ROM, an EEPROM, a flash memory or other memory technology, a CD-ROM, a Digital Versatile Disc (DVD) or other optical disc storage, a magnetic cassette, a magnetic tape, magnetic disc storage or other magnetic storage devices, or any other medium that can be configured to store desired information and that can be accessed by a computer. In addition, it is well-known to a person of ordinary skill in the art that the communication medium typically comprises a computer-readable instruction, a data structure, a program module, or other data in a modulated data signal such as a carrier wave or other transmission mechanisms, and may comprise any information delivery medium."

What is claimed is:

1. A method for realizing location switching processing, comprising:

calculating, by a mobile station, a second coordinate according to a first coordinate and a first observation value of a first base station, and a second observation value published by a second base station;

determining, according to the calculated second coordinate, whether there is a deviation in a third coordinate published by the second base station; and when it is determined there is the deviation in the third coordinate published by the second base station, calculating location information of the mobile station according to the second coordinate and the observation value of the second base station, wherein the first coordinate and the first observation value are information used for calculating the location information of the mobile station before a base station is switched; the first base station is a base station that publishes a coordinate to the mobile station before the base station is switched; and the second base station is the base station that publishes a coordinate to the mobile station after the base station is switched, wherein the determining, according to the calculated second coordinate, whether there is the deviation in the third coordinate published by the second base station, comprises:

for the third coordinate and the second coordinate, determining a coordinate difference of each dimension;

when the coordinate difference of more than one dimension is greater than a preset difference threshold, determining there is the deviation in the third coordinate published by the second base station; and when the coordinate difference of each dimension is less than or equal to the difference threshold, determining there is no deviation in the third coordinate published by the second base station, wherein the dimension comprises a direction of a coordinate axis.

2. The method according to claim 1, wherein the difference threshold is equal to 5 centimeters.

3. The method according to claim 1, further comprising:

when it is determined there is no deviation in the third coordinate published by the second base station, calculating the location information of the mobile station according to the third coordinate and the observation value of the second base station.

4. A non-transitory computer storage medium, wherein a computer program is stored in the computer storage medium, and when the computer program is executed by a processor, the method for realizing the location switching processing according to claim 1 is realized.

5. A terminal, comprising: a memory and a processor, wherein a computer program is stored in the memory, wherein the processor is configured to execute the computer program in the memory; and when the computer program is executed by the processor, the method for realizing the location switching processing according to claim 1 is realized.

6. A device for realizing location switching processing, comprising: a first resolution unit, a determination unit, and a second resolution unit, wherein the first resolution unit is configured to: calculate a second coordinate according to a first coordinate and a first observation value of a first base station and a second observation value published by a second base station;

the determination unit is configured to: determine, according to the calculated second coordinate, whether there is a deviation in a third coordinate published by the second base station; and the second resolution unit is configured to: when it is determined there is the deviation in the third coordinate published by the second base station, calculate location information of a mobile station according to the second coordinate and the observation value of the second base station, wherein the first coordinate and the first observation value are information used for calculating the location information of the mobile station before base station is switched; the first base station is the base station that publishes the coordinate to the mobile station before the base station is switched; and the second base station is the base station that publishes the coordinate to the mobile station after the base station is switched, wherein the determination unit is configured to:

for the third coordinate and the second coordinate, determine a coordinate difference of each dimension;

when the coordinate difference of more than one dimension is greater than a preset difference threshold, determine there is the deviation in the third coordinate published by the second base station; and when the coordinate difference of each dimension is less than or equal to the difference threshold, determine there is no deviation in the third coordinate published by the second base station, wherein the dimension comprises a direction of a coordinate axis.

7. The device according to claim 6, wherein the difference threshold is equal to 5 centimeters.

8. The device according to claim 6, wherein the second resolution unit is further configured to:

when the determination unit determines there is no deviation in the third coordinate published by the second base station, calculate the location information of the mobile station according to the third coordinate and the observation value of the second base station.

* * * * *